Jan. 1, 1929.

W. H. POESSE

LUBRICATING DEVICE

Filed Oct. 27, 1925

1,696,971

Inventor
Walter H. Poesse,

By Bates, Macklin,
Golrick & Teare Attorneys

Patented Jan. 1, 1929.

1,696,971

UNITED STATES PATENT OFFICE.

WALTER H. POESSE, OF CLEVELAND, OHIO, ASSIGNOR TO THE DOMESTIC ELECTRIC COMPANY, OF CLEVELAND, OHIO, A CORPORATION OF OHIO.

LUBRICATING DEVICE.

Application filed October 27, 1925. Serial No. 65,146.

This invention relates to an oiling device or system for use in lubrication of bearings for high speed shafts and is particularly adapted to that character of devices in which an oil chamber or well is used; the oil or other lubricant being fed to the bearing surfaces by the use of a wick. An object of the invention is to make a simple effective arrangement for feeding the oil upwardly to the bearing, whereby there will not be sufficient pressure upon the oil to cause it to flow from the ends of the bearing. By reason of this the arrangement is particularly useful in household appliances where the dripping of oil from bearings is a serious defect.

A further more specific object is to so arrange the device that it may be very simple to construct and capable of being embodied in a die casting, such as the end frame of a small high speed electric motor. Further objects and advantages will become apparent in the following description, which refers to the accompanying drawings illustrating a preferred embodiment of my invention adapted to a motor bearing and end bracket or frame motor. The essential characteristics of invention are summarized in the appended claims.

Figure 1:
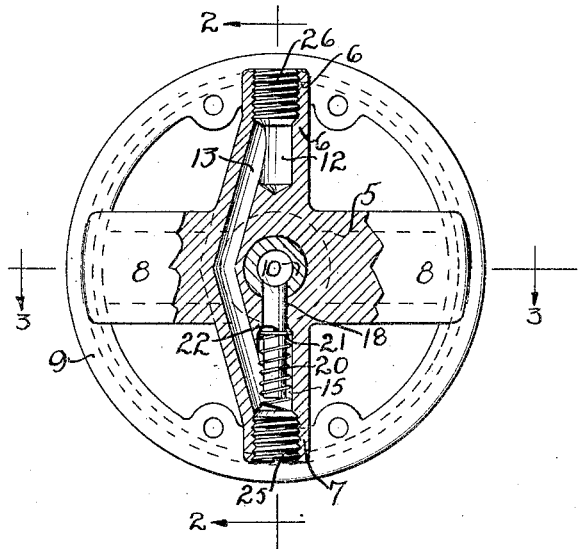
Figure 2:
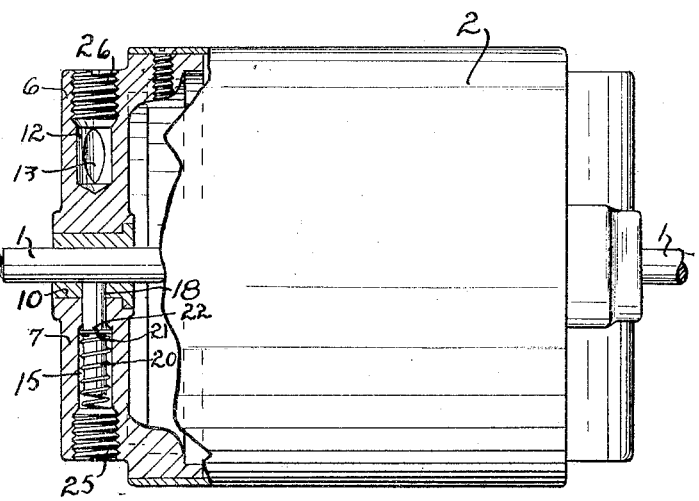
Figure 3:
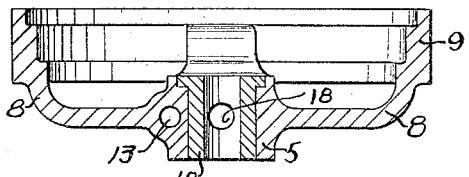

In the drawings, Figure 1 is an end view, partially in section, of such a bearing and motor frame member. Fig. 2 is a side elevation of a motor, showing the portion of the oiling arrangement in section, the plane of the section being taken on the line 2—2 of Figure 1. Figure 3 is a transverse or horizontal section through the end bracket and bearing, the plane of this section being taken on the line 3—3 of Figure 1.

The armature shaft of a motor is designated 1, a field frame being enclosed in a suitable casing 2, secured to the field of which are the end frames or brackets having bearing hubs, in the nature of journal housings 5, supported by cross arms 6, 7 and 8 preferably integral with the annular portion 9 fitting against the field. Within the journal housing is a bearing sleeve of suitable metal, indicated at 10.

Due to the usual mounting of such a motor, it is desirable to supply oil or other lubricant to an upward opening in one of the arms, as at 6. I may also provide a chamber or well capable of holding considerable lubricant, and cause this lubricant to flow upwardly to the bearing surfaces that is, between the shaft and sleeve 10, only as needed, and yet with assurance of supplying sufficient quantity for the high speed rotation. It is also desirable that the oil duct shall be large and unobstructed to allow free flow of the oil.

If oil be fed to the upper side of the bearing it has a tendency under the head or hydrostatic pressure to escape at the ends of the bearing. As previously stated the present invention eliminates these difficulties. To accomplish this I arrange the upper arm 6 so that it may be drilled or cored to form an enlargement 12 containing oil and the duct or passage 13 is formed in the enlargement of the cast, around the outside of the journal housing, returning to the lower portion of a chamber 15, formed in the arm 7. Thus in effect I provide an oil pipe or channel leading from the upper portion of the bracket around the outside of the bearing to a receptacle or chamber below. This affords large capacity of the chambers and channel and permits the free flow desired, and provides a reservoir at the lower end of the passage from which the oil may be fed to the bearing.

Extending upward from the chamber 15 is a passage 18 which leads through the bearing sleeve 10 and this may be occupied by a wick or like conductor, preferably pressed upwardly to the shaft by a spring 20, shown as pressing against a washer 21, positioned on the wick by a pin 22. The lower end of the chamber 15 is threaded to receive a plug 25. A similar plug 26 or closure, may be threaded into the upper end of the chamber 12.

It will be particularly noted that the chambers 12 and 15 are on opposite sides of the journal, and each may be cored or drilled by reason of the shape shown, thus making for cheapness of manufacture. To core or drill the channel 13 this is made straight, meeting at a point at one side of the journal housing and so aligned that straight cores will not interfere with the walls of the cavities 12 and 15. A convenient method of manufacture of such a bracket is by the use of two straight meeting cores, forming the projections of the channel 13 and extending outwardly through the ends of the arms 6 and 7. Thus with the use of a jig the walls of the cavity 12 may be drilled and threaded and likewise the walls of the cavity 15 may be so drilled and threaded. The drilling of the wall 18 may be done after firmly pressing the bearing sleeve 10 into position so as the hole 18 is drilled it may be continued through the bearing sleeve. The advantages and economies, as well as the efficiency of operation have proven to be effected by such a construction.

Having thus described my invention what I claim is:

1. The combination with a shaft, a bracket for supporting it, a bearing mounted in said bracket and embracing said shaft and having a substantially vertical radial opening through its under portion, said bracket having an upright passageway registering with said opening, capillary means in the passageway extending into the opening, said passageway extending to the exterior of the bracket but normally closed, an oil reservoir in the bracket above the bearing and a conduit from the oil reservoir to the passageway first mentioned, said conduit being made within the bracket by two straight tubular passageways registering at their inner ends and aligning with the entrance opening into the oil reservoir and the entrance to the passageway first mentioned.

2. The combination with an electric motor casing, of an open single integral spider secured thereto and forming a support for the armature shaft while ventilating the interior, a bearing sleeve carried centrally by the spider and embracing the armature shaft, said spider having a vertical arm below the armature axis and a vertical arm diametrically located above such axis, an oil reservoir in the upper vertical arm not reaching to the bearing, a vertical passageway in the lower vertical arm, capillary means in said passageway extending through an opening in the bearing into engagement with the shaft, and a passageway located entirely within arms of the spider and its connecting hub for forming a communication from the oil reservoir to the passageway occupied by the capillary member.

3. The combination with an electric motor casing, of an open spider secured thereto and carrying a bearing for the armature shaft while ventilating the interior of the motor, said spider having a vertical arm below the armature axis and a vertical arm diametrically located above such axis and projecting lateral arms, an oil reservoir in the upper projecting arm not reaching the bearing, the vertical passageway in the lower vertical arm which does reach the bearing, capillary means in the last mentioned passageway adapted to engage the armature shaft, and a passageway located within the two vertical arms and the hub portion of one of the lateral arms and forming a communication from the oil reservoir to the passageway occupied by the capillary member, said connecting passageway being made by two straight tubular passageways joining at their inner ends and at their outer ends merging with the oil reservoir and the passageway for the capillary member respectively.

4. The combination with an electric motor casing, of an open spider secured thereto and carrying a bearing for the armature shaft while ventilating the interior of the motor, said spider having a vertical arm below the armature axis and a vertical arm diametrically located above such axis and projecting side arms, an oil reservoir in the upper projecting arm not reaching the bearing, the vertical passageway in the lower vertical arm which does reach the bearing, capillary means in the last mentioned passageway adapted to engage the armature shaft, and a passageway located within the two vertical arms and one of the lateral arms and forming a communication from the oil reservoir to the passageway occupied by the capillary member, the two vertical arms being gradually widened from points adjacent their outer end toward the axis, and the connecting passageway being made by two straight tubular passageways partially occupying such widened portion of the vertical arms and joining at their inner ends and at their outer ends merging with the oil reservoir and the passageway for the capillary member respectively.

In testimony whereof, I hereunto affix my signature.

WALTER H. POESSE.